United States Patent
Blanch Costa et al.

(10) Patent No.: US 12,023,863 B2
(45) Date of Patent: Jul. 2, 2024

(54) ADDITIVE MANUFACTURING SPREADER WITH A HEATER

(71) Applicant: HEWLETT-PACKARD DEVELOPMENT COMPANY, L.P., Spring, TX (US)

(72) Inventors: Jordi Blanch Costa, Sant Cugat del Valles (ES); Daniel Gonzalez Perello, Sant Cugat del Valles (ES); Sergi Culubret Cortada, Sant Cugat del Valles (ES); Fernando Juan Jover, Sant Cugat del Valles (ES); Steven J. White, Corvallis, OR (US); Donald Higgins, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 341 days.

(21) Appl. No.: 17/298,011

(22) PCT Filed: Apr. 29, 2019

(86) PCT No.: PCT/US2019/029703
§ 371 (c)(1),
(2) Date: May 27, 2021

(87) PCT Pub. No.: WO2020/222761
PCT Pub. Date: Nov. 5, 2020

(65) Prior Publication Data
US 2022/0088867 A1    Mar. 24, 2022

(51) Int. Cl.
B29C 64/218    (2017.01)
B29C 64/295    (2017.01)
B33Y 30/00    (2015.01)

(52) U.S. Cl.
CPC .......... B29C 64/218 (2017.08); B29C 64/295 (2017.08); B33Y 30/00 (2014.12)

(58) Field of Classification Search
CPC .............................. B29C 64/295; B22F 12/10
See application file for complete search history.

(56) References Cited

U.S. PATENT DOCUMENTS

| | | | |
|---|---|---|---|
| 7,027,887 B2 | 4/2006 | Gaylo et al. | |
| 9,931,785 B2 | 4/2018 | Cullen et al. | |
| (Continued) | | | |

FOREIGN PATENT DOCUMENTS

| | | | | |
|---|---|---|---|---|
| EP | 1674243 A2 | 6/2006 | | |
| EP | 1764215 A1 * | 3/2007 | ................ | B41F 9/08 |
| (Continued) | | | | |

OTHER PUBLICATIONS

He et al., JP-2003266542-A, Sep. 2003, Espacenet, machine translation. (Year: 2003).*

*Primary Examiner* — Jacob T Minskey
*Assistant Examiner* — Adrien J Bernard
(74) *Attorney, Agent, or Firm* — Shook, Hardy & Bacon L.L.P.

(57) ABSTRACT

An additive manufacturing machine (34) comprising a build material spreading system (2). The spreading system (2) has a moveable spreader (4) with an exterior surface (8) to spread build material. The spreading system (2) also has a heater (10) located separate from the spreader (4). The heater (10) has a heat dissipater (20) extending around the spreader (4) to retain, between the dissipater (20) and the spreader (4), air (36) heated by the dissipater (20).

17 Claims, 5 Drawing Sheets

(56) References Cited

U.S. PATENT DOCUMENTS

| | | | |
|---|---|---|---|
| 2004/0005182 A1* | 1/2004 | Gaylo | B22F 12/226 400/283 |
| 2004/0061759 A1* | 4/2004 | Szlucha | B41J 11/00244 347/102 |
| 2005/0016722 A1 | 1/2005 | Sanders | |
| 2005/0205812 A1* | 9/2005 | Mamiya | G02B 27/023 250/584 |
| 2015/0231832 A1* | 8/2015 | Shi | B28B 1/001 425/226 |
| 2017/0217091 A1 | 8/2017 | Hull | |
| 2019/0030804 A1 | 1/2019 | Winters et al. | |
| 2021/0197452 A1* | 7/2021 | Ewald | B29C 64/218 |

FOREIGN PATENT DOCUMENTS

| | | | | |
|---|---|---|---|---|
| JP | 2003266542 A | * | 9/2003 | B29C 43/30 |
| WO | WO-2018194623 A1 | | 10/2018 | |
| WO | WO-2018194688 A1 | | 10/2018 | |

* cited by examiner

ADDITIVE MANUFACTURING SPREADER WITH A HEATER

BACKGROUND

Additive manufacturing machines produce 3D objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into slices each defining that part of a layer or layers of build material to be formed into the object. Build material may comprise any suitable form of build material, for example fibres, granules or powders. The build material can include thermoplastic materials, ceramic material and metallic materials.

BRIEF DESCRIPTION OF THE DRAWINGS

Some non-limiting examples of the present disclosure will be described in the following with reference to the appended drawings in which.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In some additive manufacturing processes, a binding agent is used to bind together metal particles of a powdered build material to form a solid object. The printing begins with a process of spreading the powdered build material (metal powder) on to the surface of a print area. A metal powder bed is thereby provided which covers a printing zone. Binding agent is then jetted at precise locations on to the powder bed to define the geometry of the single or multiple parts to be printed. The process then continues with an energy source assisting with the evaporation of liquid components. This process is repeated until the part or parts are formed layer by layer.

The process is undertaken by an additive manufacturing machine having, for example, two carriages. The first carriage has a roller or spreader that spreads the metal powder on the top of the print area surface to thereby provide a metal powder bed covering a printing zone. The roller presses the powder on top of the print area with the aim of maximizing the plane surface. The spreader is metal based. The second carriage has a print nozzle and energy emitter. The print nozzle jets binding agent at precise locations on to the powder bed to define the geometry of the single or multiple parts to be printed. The energy emitter assists with the evaporation of liquid components of the binding agent and the curing of the build material.

In a different example, the process is undertaken by an additive manufacturing machine having one carriage which performs the functions of the two carriages mentioned above. These functions are performed in the same single pass of the carriage over the print area. In a yet further example having one carriage, the functions are performed in more than one pass of the carriage.

Figure 1:
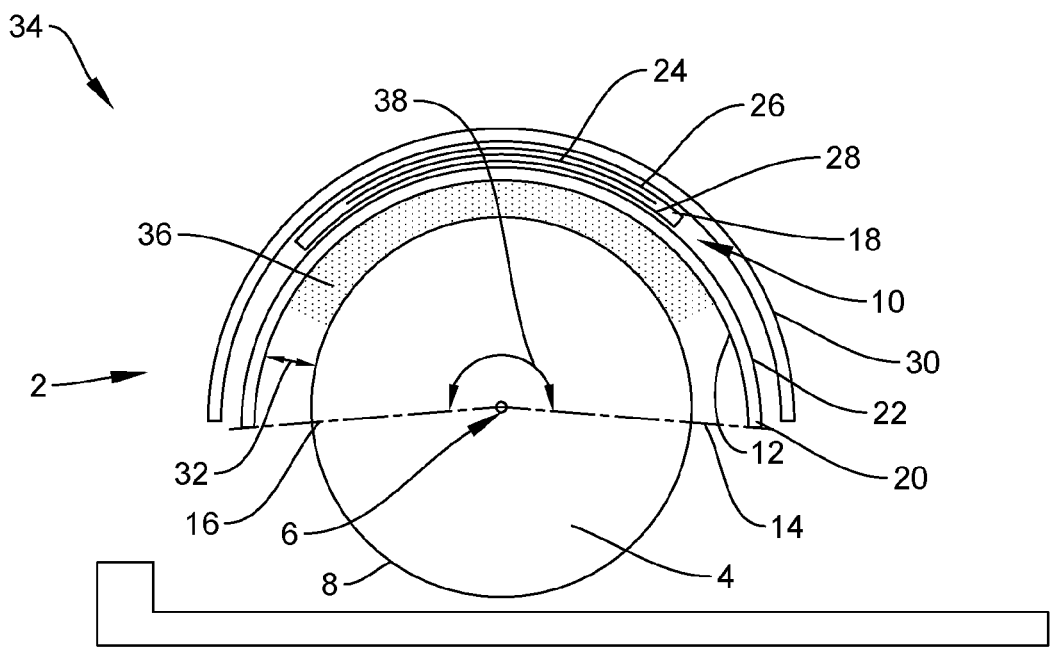
FIG. 1 is a schematic end view of a spreading system of an additive manufacturing machine in accordance with aspects of the present disclosure.

FIG. 1 shows schematic end view of a spreading system 2 of an additive manufacturing machine. The spreading system 2 has a roller 4 rotatable about a rotary axis 6 and having an exterior cylindrical surface 8 to spread build material. A roller heater 10 is located spaced from the roller 4 and has a heat surface 12 extending about the rotary axis 6 from adjacent a first circumferential position 14 on the cylindrical surface 8 to adjacent a second circumferential position 16 on the exterior cylindrical surface 8.

The roller heater 10 heats the exterior surface of the roller 4 and this ensures that condensation does not form on the exterior cylindrical surface 8 and result in build material sticking to the roller 4 as it is being spread. Build material sticking to the roller 4 in this way can result in grooves being created in the new layer of metal powder being prepared by the roller 4. Also, build material stuck to the roller exterior cylindrical surface 8 can be randomly released from the roller 4 and deposited unevenly in the new layer. So, the homogeneity of the new layer of metal powder can be adversely affected if condensation is allowed to form on the roller 4.

The feature of the heat surface 12 extending about the rotary axis 6 from adjacent a first circumferential position 14 on the cylindrical surface to adjacent a second circumferential position 16 on the exterior cylindrical surface 8 allows for an efficient heating of the roller 4. The feature allows for heating with a simple and compact arrangement which is simple to control. Furthermore, the feature allows for a simple roller design.

The extension of the heat surface 12 from adjacent a first circumferential position 14 on the cylindrical surface to adjacent a second circumferential position 16 on the cylindrical surface is in a curve. The curve is part circular in shape and is concentric with the exterior cylindrical surface 8. The curve is part circular through an arc 38 of approximately 190 degrees. In another example, the arc is between 55 and 95 degrees. In an example, the arc is 75 degrees. In these examples, the curve of the heat surface 12 is spaced from the cylindrical surface by a distance 32 of between 1 mm and 7 mm. In examples, this distance is 2 mm. In other examples, the distance is outside the 1 mm to 7 mm range. Also, in other examples, the part circular curve is not concentric with the exterior cylindrical surface 8.

The roller heater 10 has a heating element 18 and a heat dissipater element 20. The heat dissipater element 20 is of Aluminium 5052. Also, the dissipater element 20 is fabricated from sheet material having a thickness of 1.5 mm. This thickness allows for good heat transfer performance while providing sufficient structural integrity. In a different example, the dissipater element 20 is fabricated from sheet material having a different thickness than 1.5 mm.

The heat dissipater element 20 has the heat surface 12 on one side thereof and a mounting surface 22 on an opposite side thereof; and the heating element 18 is mounted to the mounting surface 22 of the heat dissipater element 20. The heating element 18 has an etched heating electric circuit 24 encased between two layers 26,28 of rubber. In the example of FIG. 1, the rubber is silicone.

The heating element 18 and the heat dissipater element 20 extend along the longitudinal length of the roller 4, and the etched heating electric circuit 24 provides greater heating per unit area at either longitudinal end of the heating element than between the longitudinal ends of the heating element 18. A thermal insulating element 30 is also provided wherein the roller heater 10 is located between the insulating element 30 and the roller 4.

An additive manufacturing machine 34 is shown schematically in FIG. 1. The moveable spreader (the roller 4) of the additive manufacturing machine 34 is heated using the heating element 18. Air 36 is retained with the heating element 18 adjacent the exterior cylindrical surface 8 of the spreader 4. The air 36 is retained adjacent the spreader 4 with the heating element 18 by the heating element 18 being spaced from the spreader 4 and extending about the exterior cylindrical surface 8 of the spreader 4 from adjacent a first position 14 on the spreader cylindrical surface 8 to adjacent a second position 16 on the spreader exterior cylindrical surface 8. The air 36 is retained adjacent the spreader 4 with the heating element 18 by locating the heating element 18 to extend around and also above the spreader 4 to trap heated air 36.

The trapping of air in this way allows for efficient heating of the spreader 4. The heating element 18 heats air in contact with the heat surface 12, and this heated air 36 then tends to flow upwards displacing cooler air which tends to flow downwards. Through this action of convection, heated air passes over the exterior cylindrical surface 8 of the spreader 4 and heats the exterior cylindrical surface 8. The temperature of the spreader 4 is thereby maintained at a level which prevents the formation of condensation on the spreader exterior cylindrical surface 8. The location of the heating element 18, and specifically of the heat dissipater element 20, around the spreader 4 reduces the volume of air being heated and location of the heating element 18 above the spreader 4 catches the rising heated air 36 and retains it in proximity to the exterior cylindrical surface 8 of the spreader 4. Again, this arrangement allows for efficient heating of the spreader 4.

The provision of a thermal insulating element 30 also allows for efficient heating. The heater 10 is located between the insulating element 30 and the spreader 4, so that the insulating element 30 is positioned above the heater 10 and thereby acts to reduce the loss of heat energy upwards from the heater 10.

Figure 2:
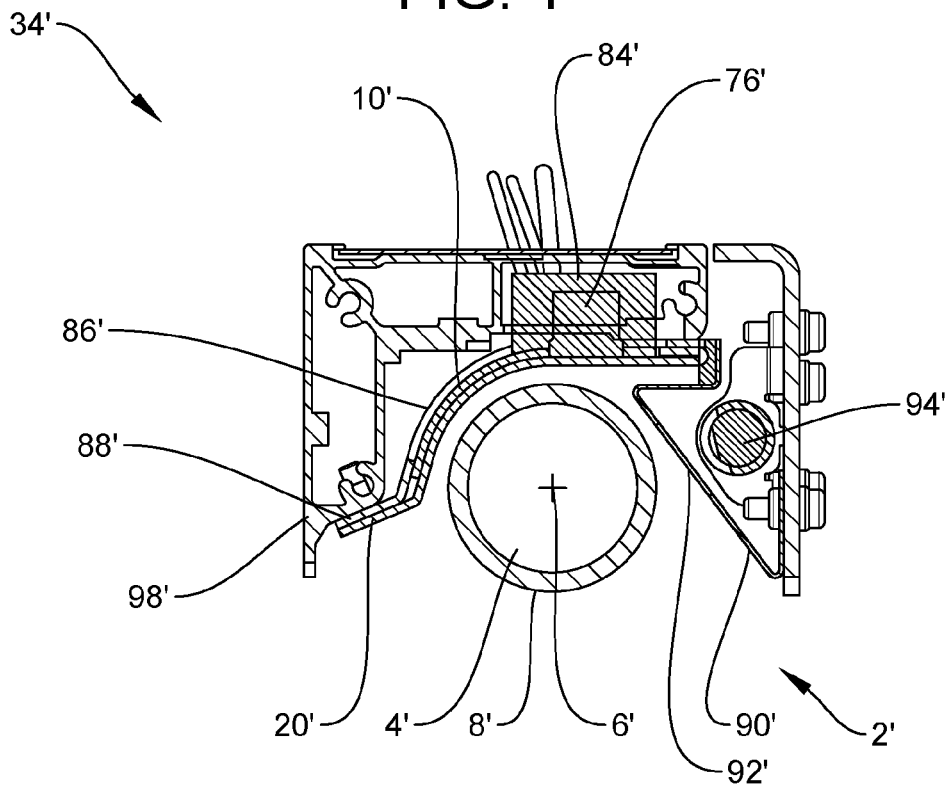
FIG. 2 is a cross-sectional end view of a spreading system of an additive manufacturing machine in accordance with aspects of the present disclosure.
Figure 3:
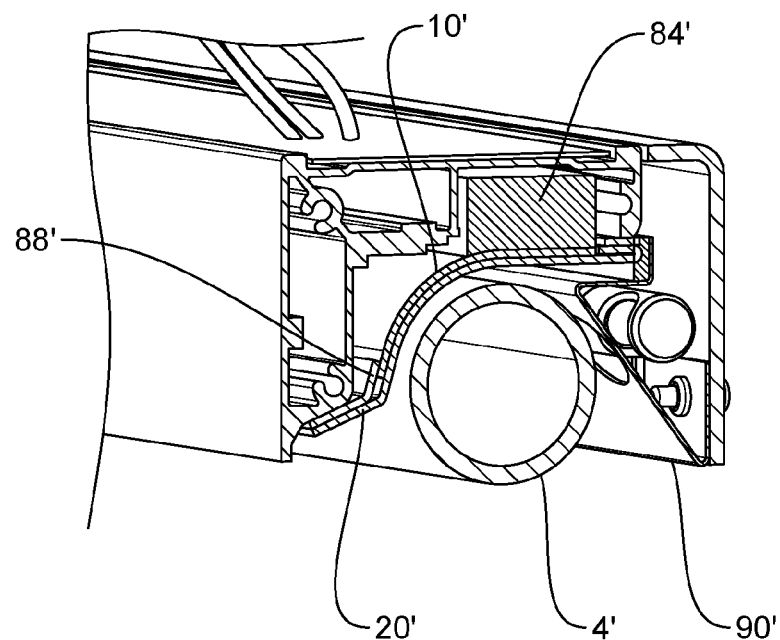
FIG. 3 is a cross-sectional perspective view of a spreading system of an additive manufacturing machine in accordance with aspects of the present disclosure.

A spreading system 2' of an additive manufacturing machine 34' in accordance with aspects of the present disclosure is shown in FIGS. 2 and 3. Components of this spreading system 2' are shown in FIGS. 4 to 10 in various stages of assembly. The spreading system 2' has features corresponding to those of the schematic spreading system shown in FIG. 1, and corresponding features are denoted with like reference numerals in the accompanying drawings. By way of example, the system of FIG. 1 has a roller 4, and the system of FIGS. 2 and 3 has a spreader 4'.

Figure 4:
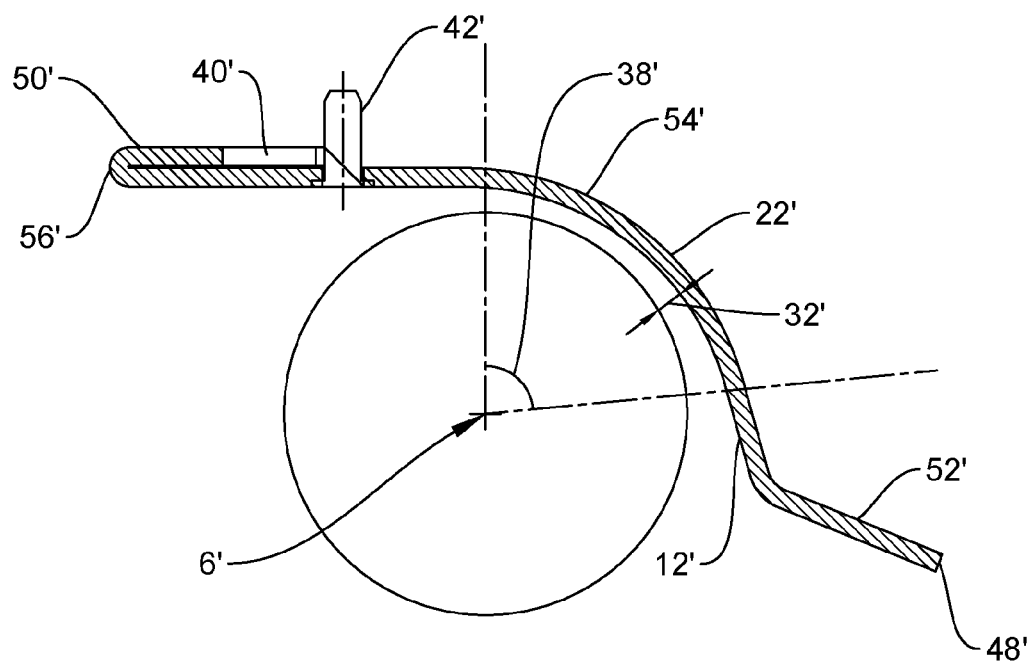
FIG. 4 is a cross-sectional end view of a spreader and a heat dissipater extending around the spreader of an additive manufacturing machine in accordance with aspects of the present disclosure.

With reference to FIGS. 2 and 3, a part-view of an additive manufacturing machine 34' is provided in which a build material spreading system 2' is shown as having a moveable spreader 4' with an exterior surface 8' to spread build material; and a heater 10' located separate from the spreader 4' and having a heat dissipater 20' extending around the spreader 4' to retain, between the dissipater 20' and the spreader 4', air 36' heated by the dissipater 20'. The heat dissipater 20' extends around the spreader at a constant distance 32' from the exterior surface 8' of the spreader 4'. With reference to FIG. 4, it will be seen that the heat dissipater 20' extends, in an arc 38' of between 55 and 95 degrees (and specifically, of 75 degrees), around the spreader 4' at a constant distance 32' of between 1 mm and 7 mm from the exterior surface of the spreader (and specifically, of 2 mm). The heat dissipater 20' extends from below the rotary axis 6' to a location above the spreader 4'.

The spreader 4' is an elongate roller having a cylindrical exterior surface 8' which is rotatable about a longitudinal rotary axis 6'. The spreader 4' is metal based and is used during operation of the machine 34' to move laterally while rotating and to thereby spread a homogenous layer of build material on the print area. Although not shown in the drawings, the spreader 4' is mounted on bearings which are themselves mounted in a support structure of the machine 34'.

The spreader heater 10' has a heat dissipater element 20', a heating element 18', and a thermal insulating element 30'. The heating element 18' is mounted on mounting surface 22' of the heat dissipater element 20', and thermal insulating element 30' is mounted so as to cover the heating element 18'.

Figure 5:
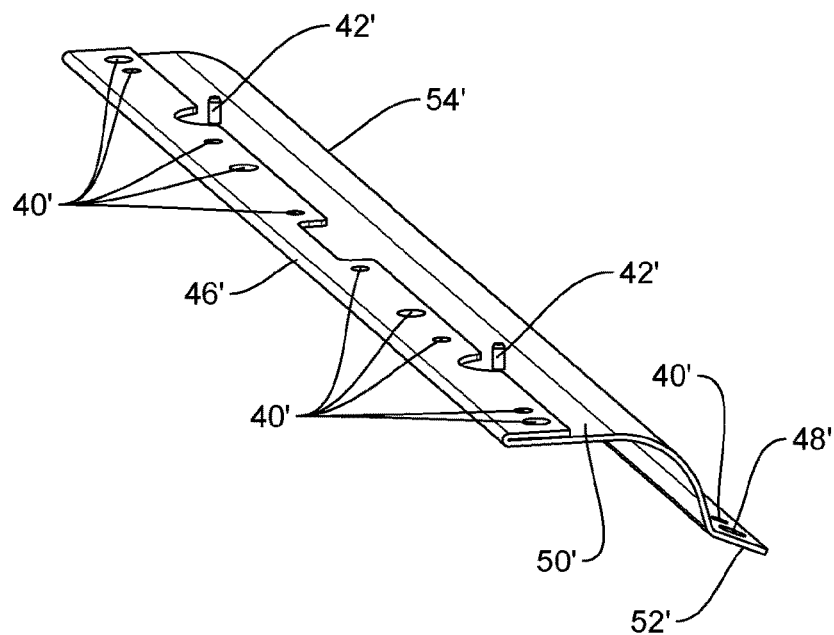
FIG. 5 is a perspective view of a heat dissipater of a spreading system of an additive manufacturing machine in accordance with aspects of the present disclosure.
Figure 6:
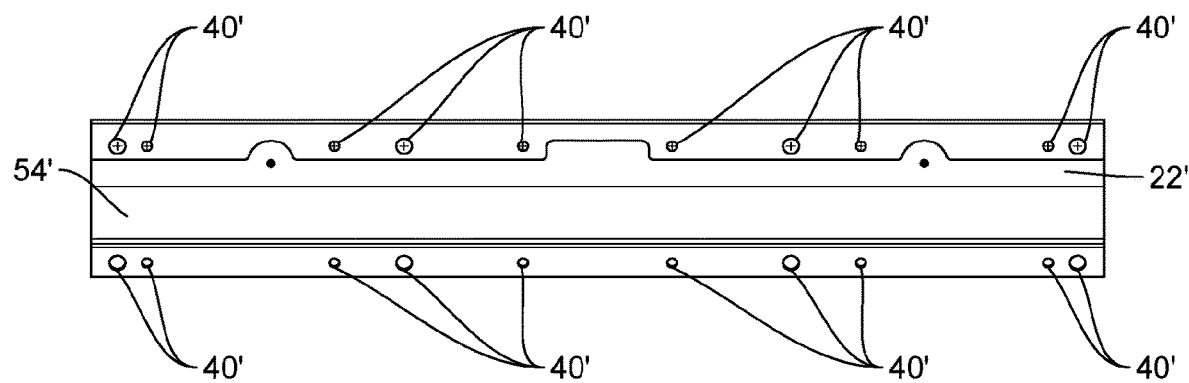
FIG. 6 is a plan view of a heat dissipater of a spreading system of an additive manufacturing machine in accordance with aspects of the present disclosure.

As shown in FIGS. 5 and 6, the heat dissipater element 20' is fabricated from sheet material. In the shown example, the sheet material is Aluminium 5052 having a thickness of 1.5 mm. The sheet has twenty holes 40' extending through its entire thickness to receive locating posts on other components and to thereby assist in correctly positioning the heat dissipater element 20' during assembly. Also, the sheet itself has two locating posts 42' extending from its mounting surface 22' and these locate in two holes 44' extending through the heating element 18' (see FIGS. 8 and 9 in particular). The positioning and relative sizing of the locating holes and posts provides for accurate positioning of components relative to one another while nevertheless allowing for thermal expansion of the components.

The twenty holes 40' of the heat dissipater element 20' are provided along opposite longitudinal edges of the dissipater element 20'. Ten holes 40' are provided adjacent an upper longitudinal edge 46' and ten holes 40' are provided adjacent a lower longitudinal edge 48'. The upper longitudinal edge 46' is provided by a longitudinal strip of sheet material having been folded back on itself to form two overlying layers of material, wherein the fold line forms the upper longitudinal edge 46'. The ten holes 40' provided adjacent the upper longitudinal edge 46' extend through the full thickness of both the two overlying layers of material. The two overlying layers are a first planar part 50' of the heat dissipater element 20' and provide a flat surface for mounting the heater 10' adjacent the spreader 4' and to another portion of the machine 34'. The ten holes 40' provided adjacent the lower longitudinal edge 48' also extend through a second planar part 52' of the heat dissipater element 20' and this again provides a flat surface for mounting the heater 10' adjacent the spreader 4' and to another portion of the machine 34'.

The first and second planar parts 50',52' of the heat dissipater element 20' are joined by sheet material having a curved part 54'. The curved part 54' extends through an arc 38' of 75 degrees. Furthermore, the curved part 54' is generally part circular in shape and arranged tangentially with the first planar part 50'. When assembled in the spreading system 2', the curved part 54' is concentric with the roller 4'.

FIG. 4 shows the position of the heat dissipater element 20' relative to the roller 4' when assembled in the additive manufacturing machine 34'. The first planar part 50' is arranged horizontally above the roller 4'. The intersection of the first planar part 50' with the curved part 54' is directly above the rotary axis 6' of the roller 4'.

Figure 7:
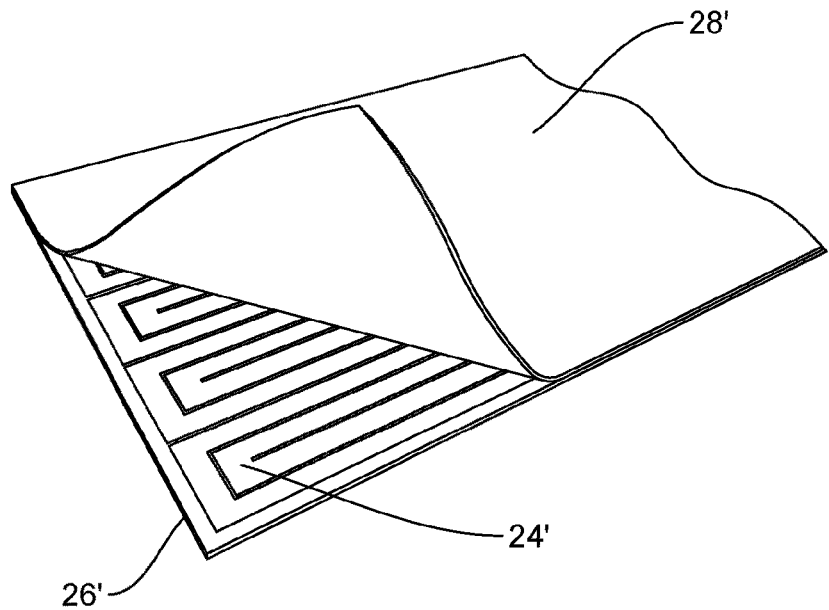
FIG. 7 is a schematic perspective view of an end part of a heating element of a spreading system of an additive manufacturing machine in accordance with aspects of the present disclosure.
Figure 8:
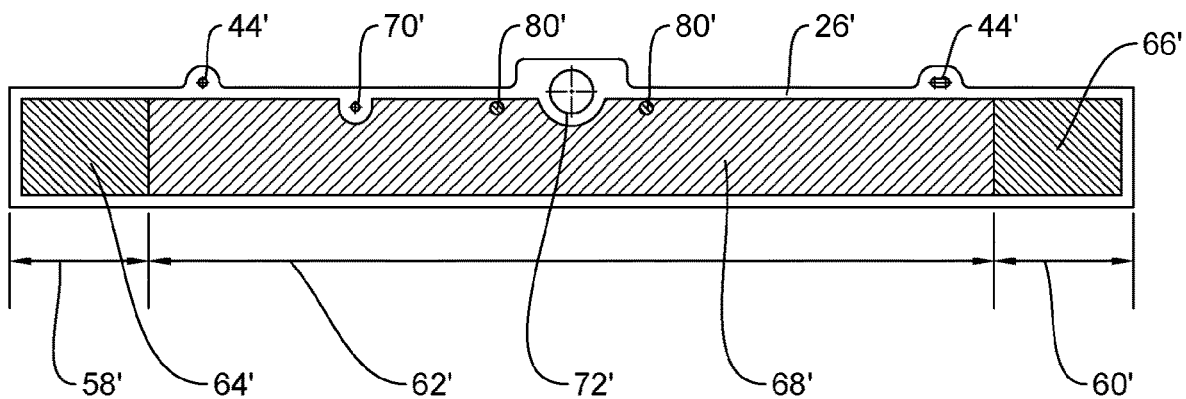
FIG. 8 is a schematic plan view of a heating element of a spreading system of an additive manufacturing machine in accordance with aspects of the present disclosure.

As shown in FIGS. 7 and 8, the heating element 18' is an etched heating electric circuit 24' encased between two planar layers 26',28' of silicone rubber sheet material. The first silicone rubber sheet 26' is vulcanized directly on to the mounting surface 22' of the heat dissipater element 20'. The mounting surface 22' is on the opposite of the heat dissipater element 20' to the roller 4' in the assembled spreader system 2'. A heat surface 12' is on the opposite of the heat dissipater element 20' to the mounting surface 22'. In other words, the heat surface 12' is on the side of the heat dissipater element 20' nearest the roller 4'.

Once the first silicone rubber sheet 26' has been vulcanized to the mounting surface 22', the etched heating electric circuit 24' is located on the first sheet 26'. The circuit 24' is retained on the first sheet 26' with an adhesive. The second silicone rubber sheet 28' is then located over the first silicone rubber sheet 26' so as to sandwich the etched heating electric circuit 24' between the two sheets 26',28'. Finally, the assembly of rubber sheets 26',28' and electric circuit 24' is pressed and placed under temperature (around 260 degrees Celsius) to vulcanize and seal the electric circuit 24' in silicone. The sealing of the electric circuit 24' protects the circuit from exposure to build material during use of the additive manufacturing machine 34'.

A schematic view of the etched heating electric circuit 24' is shown in FIGS. 7 and 8. FIG. 7 shows an end part of a length of the heating element 18'. Electrical connecting wires 56' are shown in FIG. 8 extending from the circuit 24'. The ends of the wires 56' are provided with electrical connectors (not shown) of a grade to seal against the ingress of water. Protection against the ingress of build material powder is thereby provided.

The configuration of the etched heating electric circuit 24' is such that the circuit 24' extends along the longitudinal length of the heat dissipater 20'. Also, the configuration of the circuit 24' is such that the circuit 24' provides greater heating per unit area at either longitudinal end of the heating element 18' than between the longitudinal ends of the heating element 18'. With regard to FIG. 8, it will be seen that along two lengths 58',60' at either end of the heat dissipater 20', the heating element 18' has a power density different to the power density in the intervening length 62' between the two end lengths 58',60'. The power density along the two end lengths 58',60' is greater than the power density along the intervening length 62' of heat dissipater 20'. The power density along the two end lengths 58',60' is 4 Watts per square centimetre and the power density along the intervening length 62' is 3 Watts per square centimetre. The area 64',66' of each end length 58',60' is 19 square centimetres. The area 68' of the intervening length 62' is 122 square centimetres.

The higher power density at the ends of the heating element 18' compensates for a greater rate of heat loss in these locations than occurs in an area midway along the heating element 18'. A more homogenous heating along the entire length of the heating element 18' is thereby provided, which in turn provides a more homogenous heating of the roller 4' along its length.

The heater 10' also has an NTC (Negative Temperature Coefficient) sensor 74' and a thermostat 76'. As shown in FIG. 8, the silicone rubber covering the circuit 24' has first and second holes 70',72' which allow for use of the NTC sensor 74' and a thermostat 76' respectively. The NTC sensor 74' measures the temperature of the heat dissipater 20' and the thermostat 76' operates to limit the maximum temperature of the heat dissipater 20' based on the measurements from the NTC sensor 74'.

The thermostat 76' is welded to the etched heating electric circuit 24' in the second hole 72' and associated wiring 78' is welded to the circuit 24' at points 80' as shown in FIG. 8. The NTC sensor 74' is placed in the first hole 70' with associated wiring 82', and then the NTC sensor 74' and the thermostat 76' are covered in silicone rubber. The silicone rubber is subjected to conditions (pressure and temperature) suitable for it to become vulcanized, thereby encasing and sealing the NTC sensor 74' and the thermostat 76' in silicone. This protects the NTC sensor 74' and the thermostat 76' from exposure to liquid and build material, and reduces the likelihood of these components being damaged by their surroundings.

Figure 9:
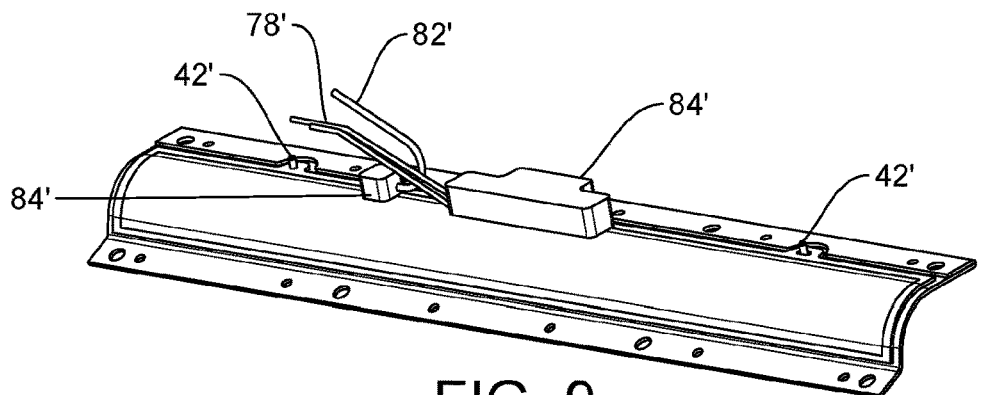
FIG. 9 is a schematic perspective view of a spreader heater of a spreading system of an additive manufacturing machine in accordance with aspects of the present disclosure.
Figure 10:
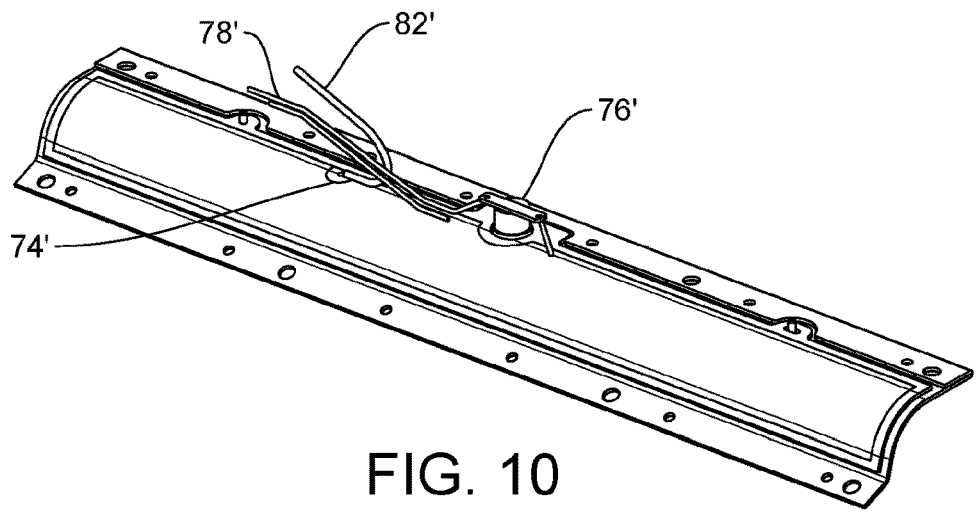
FIG. 10 is a schematic perspective view of a part-assembled spreader heater of a spreading system of an additive manufacturing machine in accordance with aspects of the present disclosure.

In the example shown, the NTC sensor 74' and the thermostat 76' (and the associated connections of wiring thereto) are individually encased in silicone 84'. This is done by using separate moulds which are placed over the NTC sensor 74' and the thermostat 76' and into which silicone rubber is injected. Once the silicone rubber as solidified, then the moulds are removed. FIG. 10 shows the NTC sensor 74' and the thermostat 76' prior to being encased in silicone rubber. FIG. 9 shows the NTC sensor 74' and the thermostat 76' encased in silicone rubber after the moulds have been removed. Both FIGS. 9 and 10 show the heater 10' mounted to the mounting surface 22' the heat dissipater 20'.

Once the complete heater 10' has been constructed on the heat dissipater 20', a thermal insulating element 30' is mounted to the dissipater element 20' to cover the heater 10'. The heater 10' is thereby sandwiched between the insulating element 30' and the heat dissipater 20'. This arrangement assists in preventing heat transfer from the heater 10' to anywhere other than to the heat surface 12'. This contributes to an efficient heating of the roller 4'.

Figure 11:
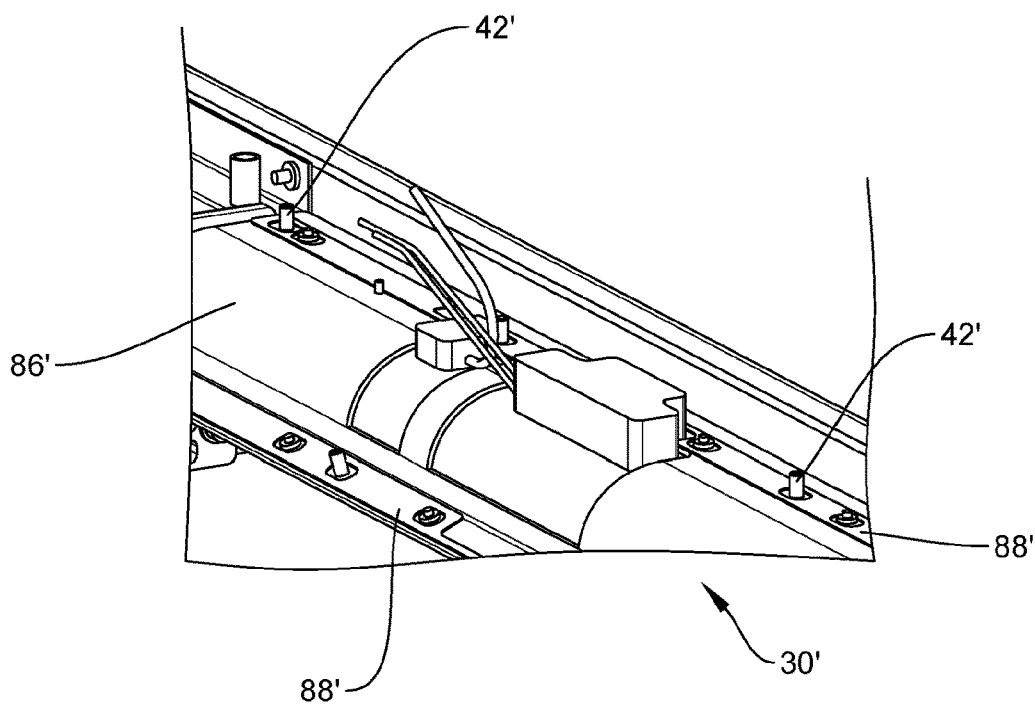
FIG. 11 is a schematic perspective view of a spreader heater and a thermal insulating element of a spreading system of an additive manufacturing machine in accordance with aspects of the present disclosure.

As shown in FIGS. 2, 3 and 11, the thermal insulating element 30' is formed from a thermally insulating foam layer 86' mounted to sheet metal frame 88' surrounding the perimeter edge of the foam layer 86'. The frame 88' is of steel, to assist in reducing the thermal conductivity characteristics of the insulating element 30' as a whole. The frame 88' is provide with locating holes for assisting with positioning insulating element 30' during assembly.

FIGS. 2 and 3 show the assembled spreading system 2' mounted to a structural element 98' of an additive manufacturing machine 34'. A part of the additive manufacturing machine 34' is shown in the FIGS. 2 and 3. The heat dissipater 20' is generally positioned to one side of the roller 4' as previously mentioned in relation to the Figures. On another side of the roller 4', a folded sheet panel 90' is provided. The panel 90' has a viewing window 92' for a roller sensor 94', and extends from below the rotary axis 6' to a location above the roller 4' and adjacent the upper longitudinal edge 46' of the heat dissipater 20'. The panel 90' is joined with the edge 46' and is spaced from the roller 4' by the same distance as the heat dissipater 20' is spaced from the roller 4'. The panel 90' thereby assists in retaining heated air adjacent the exterior surface 8' of the roller 4'.

During use of the spreading system 2', the heating element 18' heats the heat dissipater 20' which in turn heats adjacent air located between the heat dissipater 20' and the roller 4'. This heated air then tends to flow upwardly in the space between the heat dissipater 20' and the roller 4' under the action of convection. The exterior surface 8' of the roller 4' is thereby exposed to heated air and is itself heated. The heated air tends to flow across the exterior surface 8' to the top of the roller 4' where it is trapped by the dissipater 20'. This allows heat to be retained adjacent the roller 4' rather than being lost to the surrounding environment. The thermal insulating element 30' above the heater 10' also assist in reducing heat loss to the surrounding environment. In addition, the folded sheet panel 90' assists in trapping the heated air adjacent the roller 4'. This action of heating the exterior surface 8' occurs while the roller 4' rotates, and so the entire circumference of the roller 4' repeatedly moves into close proximity to the heat surface 12' of the dissipater 20' and is thereby heated by the heater 10'. The formation of condensation on the roller 4' is thereby avoided in an efficient manner.

The heater 10' is efficient in avoiding the formation of condensation on the roller 4', but is also readily assembled and maintained, is compact, simple, and reliable, and can be conveniently and cost effectively used in conjunction with a large range of existing spreader types.

Build material may comprise any suitable form of build material, for example short fibres, granules or powders. A powder may include short fibres that may, for example, have been cut into short lengths from long strands or threads of material. The build material can include thermoplastic materials, ceramic material and metallic materials. Binding agents may include chemical binder systems, such as in Binder Jet or metal type 3D printing.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited by the claims and the equivalents thereof.

The invention claimed is:

1. A spreading system for an additive manufacturing machine, that during operation comprises:
   a roller rotatable about a rotary axis and comprising a heated exterior cylindrical surface to spread build material; and
   a heating element configured to heat a heat dissipater element for heating the heated exterior cylindrical surface of the roller, the heating element extending along a longitudinal length of the heat dissipater element, the heat dissipater element having a first surface facing the heated exterior cylindrical surface of the roller from adjacent a first circumferential position on the heated exterior cylindrical surface to adjacent a second circumferential position on the heated exterior cylindrical surface, such that the heat dissipater element is located between the heating element and the roller.

2. The spreading system of claim 1, wherein the heat dissipater element extending from adjacent the first circumferential position on the heated exterior cylindrical surface to adjacent the second circumferential position on the heated exterior cylindrical surface is formed in a curve.

3. The spreading system of claim 2, wherein the curve is part circular in shape and concentric with the heated exterior cylindrical surface of the roller.

4. The spreading system of claim 3, wherein the curve is part circular through an arc of between 55 and 95 degrees.

5. The spreading system of claim 3, wherein the curve of the heat dissipater element is spaced between 1 mm and 7 mm from the heated exterior cylindrical surface of the roller.

6. The spreading system of claim 1, wherein the first surface of the heat dissipater element is a heating surface, wherein a second surface of the heat dissipater element on an opposite side to the first surface is a mounting surface, and wherein the heating element is mounted to the mounting surface of the heat dissipater element.

7. The spreading system of claim 6, wherein the heating element comprises an etched heating electric circuit encased between two layers of rubber.

8. The spreading system of claim 7, wherein the etched heating electric circuit provides greater heating per unit area at either of a first longitudinal end or a second longitudinal end of the heating element than along an intervening length between the first longitudinal end and the second longitudinal end of the heating element.

9. The spreading system of claim 1, further comprising a thermal insulating element, wherein the heating element is located between the thermal insulating element and the heat dissipater element.

10. A method of heating a roller of a spreading system for an additive manufacturing machine, the method of heating comprising:
    using a heating element of a roller heater to heat an exterior cylindrical surface of the roller, the roller heater spaced from the exterior cylindrical surface of the roller, the roller heater comprising a heat dissipater element located between the heating element and the exterior cylindrical surface of the roller, the heat dissipater element comprising a heat surface facing the exterior cylindrical surface of the roller, the heat dissipater element extending from adjacent a first circumferential position on the exterior cylindrical surface of the roller to adjacent a second circumferential position on the exterior cylindrical surface of the roller; and retaining heated air adjacent the exterior cylindrical surface of the roller and the heat surface of the roller heater during operation.

11. The method of heating of claim 10, wherein the heated air is retained adjacent the exterior cylindrical surface of the roller by locating the heating element to extend around and above the heat dissipater element to trap the heated air.

12. An additive manufacturing machine comprising a build material spreading system that during operation, the build material spreading system comprises:

a roller rotatable about a rotary axis and comprising a heated exterior cylindrical surface to spread build material; and a heating element configured to heat a heat dissipater element for heating the heated exterior cylindrical surface of the roller, the heating element extending along a longitudinal length of the heat dissipater element, the heat dissipater element having a first surface facing the heated exterior cylindrical surface of the roller from adjacent a first circumferential position on the heated exterior cylindrical surface to adjacent a second circumferential position on the heated exterior cylindrical surface, such that the heat dissipater element is located between the heating element and the roller.

13. The additive manufacturing machine of claim 12, wherein the heat dissipater element extends around the roller at a constant distance from the heated exterior cylindrical surface of the roller.

14. The additive manufacturing machine of claim 12, wherein the heat dissipater element extends, in an arc of between 55 and 95 degrees, around the roller at a constant distance of between 1 mm and 7 mm from the heated exterior cylindrical surface of the roller.

15. The additive manufacturing machine of claim 12, wherein the heating element comprises an etched heating electric circuit encased between two layers of rubber.

16. The additive manufacturing machine of claim 15, wherein the etched heating electric circuit provides greater heating per unit area at either of a first longitudinal end or a second longitudinal end of the heating element than along an intervening length between the first longitudinal end and the second longitudinal end of the heating element.

17. The additive manufacturing machine of claim 12, further comprising a thermal insulating element wherein the heating element is located between the thermal insulating element and the heat dissipater element.

* * * * *